R. B. ALLYN.
DRAFTING INSTRUMENT.
APPLICATION FILED JUNE 16, 1915.
1,156,512. Patented Oct. 12, 1915.
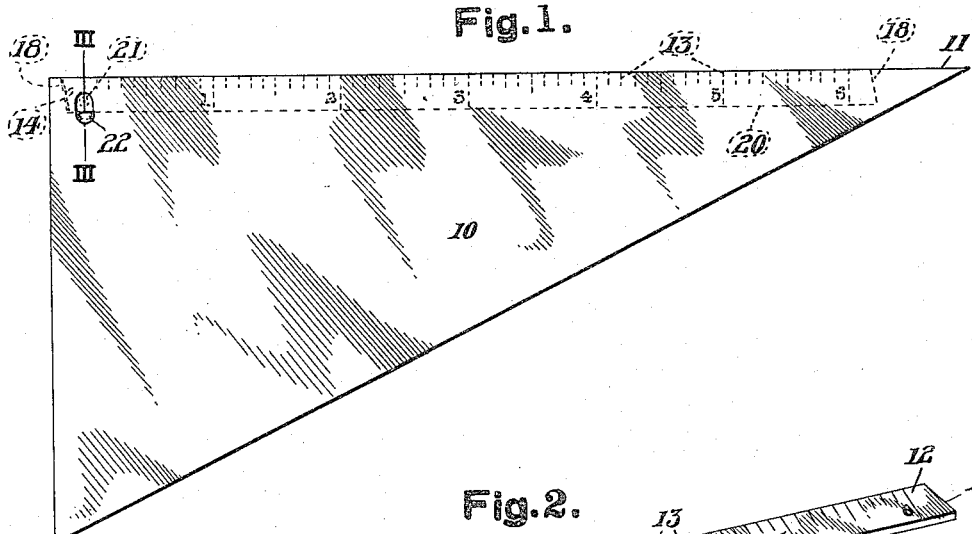
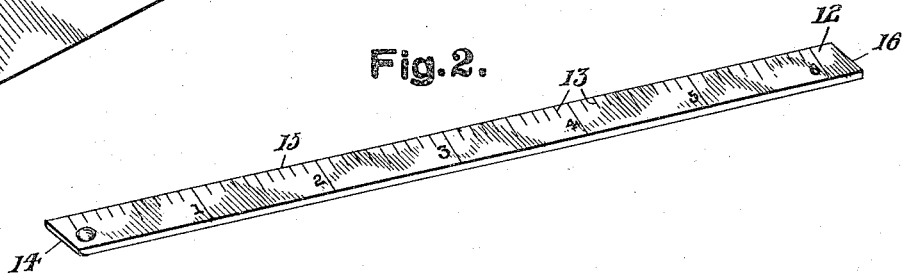
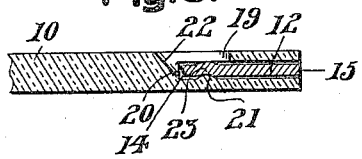 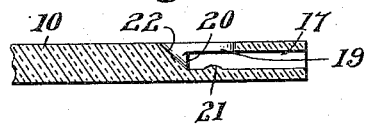
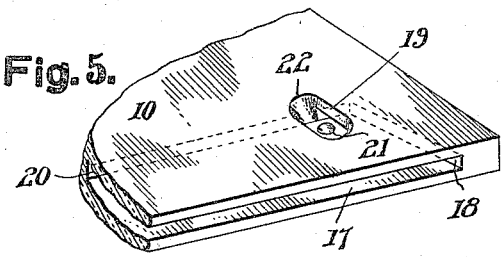
Inventor,
Rufus B. Allyn
By T. R. Bryant
Attorney.

UNITED STATES PATENT OFFICE.

RUFUS B. ALLYN, OF COLORADO SPRINGS, COLORADO.

DRAFTING INSTRUMENT.

1,156,512. Specification of Letters Patent. Patented Oct. 12, 1915.

Application filed June 16, 1915. Serial No. 34,421.

*To all whom it may concern:*

Be it known that I, RUFUS B. ALLYN, a citizen of the United States, residing at Colorado Springs, in the county of El Paso and State of Colorado, have invented certain new and useful Improvements in Drafting Instruments, of which the following is a specification.

This invention relates to certain new and useful improvements in drafting instruments.

The primary object of this invention is the provision of a combined scale and triangle removably assembled whereby the scale may be employed alone or for denoting edge graduations when combined with the triangle.

A further object of the invention is the provision of a scale provided with any desired graduations and being insertible in a viewable position within any straight edge of an instrument formed for the removable reception thereof.

A still further object of the invention is to provide a transparent straight edge drawing instrument arranged for the removable reception of a graduated scale and whereby the instrument may be used as a scale, it being understood that as many straight edge sides thereof may be so provided as desired, while a pencil point releasable engaging means for temporary securement is provided for the scale.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views:—Figure 1 is an elevational view of a triangle provided with a scale arranged therein as now devised, the scale being illustrated in dotted lines. Fig. 2 is a perspective view of the scale employed with the device. Fig. 3 is an enlarged sectional detail view taken upon line III—III of Fig. 1. Fig. 4 is a sectional view similar to Fig. 3 but with the scale removed, and, Fig. 5 is an enlarged perspective view of a corner portion of the triangle with the scale removed.

The present device will be now described in connection with a triangle 10 of the usual form, the invention being arranged solely at the longer leg of the triangle and the edge 11 thereof although it is to be understood that the invention is similarly applicable to any straight edge drawing instrument and may be utilized for each edge of a triangle if so desired.

A scale 12 is employed having any desired graduations 13 thereon which may be required for engineers, architects or any vocation with which the instrument is desired for use. The said scale 12 as well as the triangle 10 with which it is employed are preferably formed of transparent material, such as pyroxylin. One end of the scale 14 at the beginning of the graduations thereof is slightly rounded and is also inclined away from its operating edge 15 while the opposite end 16 thereof is similarly inclined, thus making the opposite ends of the scale parallel to each other, the scale as an entirety being in the form of a rhomboid. The edge 11 of the triangle is provided with a centrally-positioned receiving slot 17 forming a socket and adapted for the removable reception of the scale 12, the said socket being provided with oblique parallel end walls 18 substantially conforming to the scale ends 14 and 16, the said socket being of slightly greater length than the scale so as to allow the ready insertion and removal of the scale.

The triangle 10 is provided with an oval-shaped perforation 19 in one face thereof and communicating with the edge socket 17 adjacent the bottom 20 of the said socket and at a point slightly removed from one end thereof. The wall of the socket 17 opposite the perforation 19 is provided with a hump or projection 21 while the inner longitudinal end 22 of the perforation 19 is inwardly beveled from the face of the triangle at which the perforation opens to the face of the socket 17 which is provided with a hump 21.

With the scale 12 operatively positioned in the socket 17 of the triangle 10 as best illustrated in Fig. 1, it will be evident that the graduations of the scale may be readily discerned from either side of the triangle and that the edge 11 may be thus employed as a scale, the graduated edge 15 of the scale 12 lying flush with the ruling edge 11 of the triangle. The oblique end 16 of the scale is slightly retained in contact with the similarly inclined end 18 of the receiving socket 17 by means of a recess 23 formed on one side of the scale 12 and adjacent the end 14 thereof, which recess is received over the projection 21 when the scale is forcibly moved to its seated position within the socket 17 and with the scale end 14 substantially in contact with the adjacent end 18 of the receiving socket in parallelism with which it is then positioned.

When desired to remove the scale 12 from its receiving socket 17, any pointed instrument may be readily inserted in the perforation 19 and by sliding the same upon the inclined portion 22, the adjacent edge of the scale 12 is contacted for readily removing the scale recess 23 from the socket projection 21 and forcing the edge 15 of the scale sufficiently out of the socket 17 to allow the operator to engage the scale end 14 and then completely remove the scale from the triangle.

It will thus be evident that a serviceable drafting instrument is provided and one that is inexpensive and easy to manufacture although being efficient in its use for accomplishing the desired objects.

While the form of the invention herein set forth is the preferred embodiment thereof, it will be understood that certain changes and alterations may be made therein without departing from the present invention, such for instance, as the employment of a non-transparent scale having graduations upon its opposite edges and therefore reading in opposite directions and viewable from the opposite sides of the triangle, while a non-transparent triangle may be employed having the graduations formed directly upon the operative edge of the scale and thereby viewable centrally of the operative edge of the triangle.

What I claim as new is:—

1. A drafting triangle having a centrally-positioned edge socket provided with parallel oblique ends and having an oval-shaped perforation communicating between one face of the triangle and a point adjacent the bottom of the said socket, a projection within the said socket upon the wall thereof opposite the said perforation and being in alinement with the said perforation, the said perforation having its inner edge inclined to a point adjacent the bottom of the socket at the inner edge of the said opposite wall thereof, the said scale being provided with a recess adjacent one end thereof and removably positioned over the said projection when the scale is seated within the said socket with the ends of the scale lying in parallelism with the ends of the socket.

2. A drafting instrument formed of transparent material provided with a longitudinal slot socket in its operative straight edge, the ends walls of the said socket being arranged obliquely with respect to said straight edge and in parallelism, and a rhomboidal-shaped scale member removably retained within the said socket.

3. A transparent drafting instrument having a slot socket in the operative straight edge thereof, the opposite ends of the said socket being inclined and parallel to each other, a graduated scale positionable within the said socket and substantially conforming to the configuration thereof, and disengageable connections between the said scale and instrument.

4. A device of the class described, comprising a transparent drafting instrument having a receiving slot socket in the edge thereof and having a side perforation therein communicating with the said socket, a transparent scale removably positioned within the said socket and lying inwardly of the said perforation, engaging means for the said scale carried by a wall of the said socket and the said perforation having an inner oblique guiding edge inclined toward the adjacent edge of the said scale.

5. A drafting instrument having an edge socket therein having one inwardly inclined retaining end, the said instrument being provided with a receiving perforation in one face thereof communicating with the said socket, a projection within the said socket opposite the said perforation, a transparent scale having one end thereof conforming to and being in engagement with the said retaining end of the socket when the scale is operatively positioned in the latter, the said scale being provided with a recess adjacent its opposite end adapted for the removable reception of the said projection.

6. A transparent drafting instrument provided with a socket in its operative straight edge, a scale removably positionable within the said socket, one edge of the scale adapted for inter-engagement with the adjacent end of the socket, disengageable connections at the opposite end of the scale, and guiding means for a releasing member adjacent the said last-named end of the scale.

In testimony whereof I affix my signature in presence of two witnesses.

RUFUS B. ALLYN.

Witnesses:
ELEANOR T. WALMSLEY,
ROBERT KERR.